United States Patent Office 3,732,297
Patented May 8, 1973

3,732,297
BIS(ACID HALIDE) DIHYDROANTHRACENES
Desmond Sheehan, Fairfield, Conn., assignor to American Cyanamid Company, Stamford, Conn.
No Drawing. Application Oct. 11, 1968, Ser. No. 766,989, which is a division of application Ser. No. 489,748, Sept. 23, 1965, now Patent No. 3,470,103. Divided and this application Dec. 16, 1970, Ser. No. 98,943
Int. Cl. C07c 63/46
U.S. Cl. 260—544 M                2 Claims

ABSTRACT OF THE DISCLOSURE

New 9,10-substituted anthracenes which are useful in a chemiluminescent reaction, having the structure

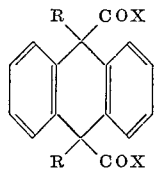

wherein X is a halo group and R is a phenyl group.

---

This application is a division of copending application Ser. No. 766,989, filed Oct. 11, 1968, now U.S. Pat. No. 3,637,784, issued Jan. 25, 1972, which was a division of application Ser. No. 489,748, filed Sept. 23, 1965, now U.S. Pat. No. 3,470,103, issued Sept. 30, 1969.

The present invention relates to novel compositions of matter and reactions for the direct generation of light from chemical energy. By "light" as referred to herein is meant electromagnetic radiation at wavelengths falling between 350 m$\mu$ and 800 m$\mu$.

The art of generating light from chemical energy, i.e., chemiluminescence, is continually in search of compositions which when reacted substantially improve the intensity and lifetime of light emission. Obviously, improved compositions are constantly in demand for use as signal devices, for area illumination, etc.

The art has known for some time that a solution of (1) oxalyl chloride, (2) aqueous hydrogen peroxide, and (3) a fluorescent compound generates a light whose life is very short (on the order of about 8 to 30 seconds) and whose intensity is not exceptional, i.e., whose intensity is of little practical utility. Numerous attempts have been made to improve this chemiluminescent composition and many others similar to it, but with little success.

According to a publication by Edward A. Chandross, the chemiluminescent reaction of oxalyl chloride may be represented as occurring by the following mechanism:

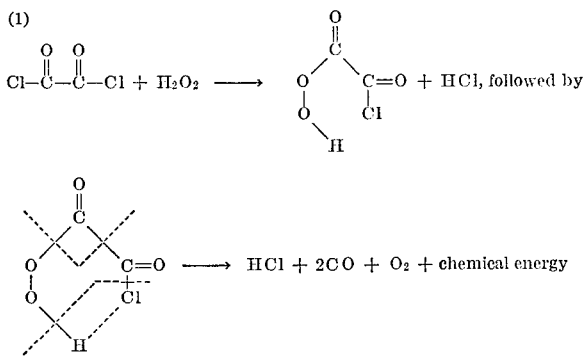

In the above reactions, a cyclic transition structure is formed, followed by a breakdown of the ring into hydrochloric acid, carbon monoxide, oxygen, and chemical energy.

The mechanism of the oxalyl chloride chemiluminescent reaction (as above represented by Chandross) requires solely (1): (a) oxalyl chloride and (b) hydrogen peroxide as necessary reactants to produce a chemical energy release, and (2): any diluent having sufficient solvent properties to form a solution of the above two critical reactants.

The mechanisms by which chemiluminescent light may be generated are so poorly understood that it is not possible at present to predict those structures which convey the chemiluminescent property. This is amply illustrated by the phthalhydrazide series of compounds, some of which are appreciably chemiluminescent and some of which are not substantially nor significantly chemiluminescent [see A. Bernanose, "Bull. Soc. Chim. France," 17,567 (1950)].

The term "chemiluminescent reactant" as used herein means a mixture which when in the presence of a suitable fluorescer will result in a chemiluminescent reaction (1) independently or (2) when reacted with other necessary reactants in the processes as disclosed herein.

The term "chemiluminescent composition" as used herein means a mixture which includes chemiluminescent reactants, which includes the presence of a suitable fluorescer, and which will result in chemiluminescence.

The term "admixing" as used herein means "reacting" or sufficiently bringing together component reactants to obtain a chemiluminescent reaction.

The term "organohydroperoxide," as used herein, represents a peroxide compound which includes (1) at least one "HOO—" group and (2) at least one "R—" group, or a composition which upon reaction produces such a peroxide compound, where a typical organohydroperoxide is ROOH. "R" is typically defined as an alkyl hydrocarbon group, substituted or unsubstituted.

The term "organoperacid," as used herein, represents a peroxide compound which includes (1) at least one "HOO—" group and (2) at least one

group or a composition which upon reaction produces such a peroxide compound. A typical organoperacid is

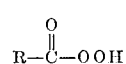

"R" is defined as an alkyl or an aryl hydrocarbon group, substituted or unsubstituted, for example.

The term "fluorescer-precursor" means a compound which upon a chemiluminescent reaction, which reaction includes the presence of a peroxide compound, produces a compound which is fluorescer.

The term "fluorescer" includes typical conventional fluorescers as well as any other compound which generates light when irradiated with an ultraviolet or visible "excitation" source.

The term "anhydride" as used herein includes the substituted

where R is hydrogen, alkyl, substituted alkyl, aryl and substituted aryl as found in conventional anhydrides such as acetyl anhydride, benzoyl anhydride, etc., as well as sulfonyl and phosphonyl anhydrides of carboxylic acid such as $$-\overset{O}{\underset{\|}{C}}O\overset{O}{\underset{\|}{S}}R \quad \text{and} \quad -\overset{O}{\underset{\|}{C}}O\overset{O}{\underset{\|}{P}}(OR)_2$$

for example. Also included is the bridged anhydride substituent $$-\overset{O}{\underset{\|}{C}}O\overset{O}{\underset{\|}{C}}-$$

as found in paradihydropolycyclic aromatic hydrocarbons bridged across the para positions by the anhydride substituent.

The term "peroxide compound" as used herein includes typical peroxides such as hydrogen peroxide, hydroperoxides, and organoperoxides such as peroxyacids and diaryl and diaroylperoxides as defined above, etc., and other compounds which upon reaction produce the peroxide group.

The term "hydroperoxide" compound, as used herein, represents (a) a peroxide compound which includes at least one "HOO—" group, in typical compound such as

"ROOH"

or $$\text{"R}\overset{O}{\underset{\|}{C}}\text{OOH"}$$

or HOOH, or (b) a composition which upon reaction produces such a peroxide compound, where a typical hydroperoxide is ROOH, including the perhydrates such as urea peroxide or sodium pyrophosphate peroxide or sodium perborate, as well as alkali metal salts of these peroxides. R is defined below, in the disclosure relating to dehydrating agents.

The term "hydrogen peroxide compound" includes (1) hydrogen peroxide and (2) hydrogen peroxide-producing compounds such as urea peroxide, melamine peroxide, sodium perborate, and the like.

By "non-reactive diluent" is meant a diluent which will not react in a manner which will defeat the chemiluminescent reaction.

The term "diluent," as used herein, means a solvent or other vehicle which when employed as or with a solvent does not cause insolubility, and obtains an intimate mixture.

The term "solid," as used herein, refers to a state in which the materials are in the absence of a solvent such as water or other diluent, and the materials may be virtually in the form of a single solid state, or of lumps, or of ground or crushed particles, or of a powdery material.

It is an object of this invention to obtain a chemilumescent composition and a process employing said composition whereby a high efficiency may be obtained in the conversion of chemical energy into light.

Another object is to obtain a chemiluminescent compound which produces a light over an extended period of time.

Another object of this invention is to obtain a chemiluminescent composition which attains a light of substantially higher intensity than has been obtained with former chemiluminescent compositions.

Another object of this invention is to obtain a chemiluminescent composition which may be employed to obtain light by a process which is mechanically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant which when reacted will obtain chemiluminescent light by a process which is not hazardous.

Another object of this invention is to obtain a chemiluminescent reactant which when employed in the presence of a fluorescent compound will change the color of the chemiluminescent light, depending upon the fluorescent compound employed.

We have discovered that the objects of this invention are obtained by admixing reactants including (1) a fluorescer-precursor compound of the formula $Y_1$—A—$Y_2$, defined hereafter, (2) sufficient diluent to form a solution or intimate mixture of reactants, and (3) any conventional peroxide compound.

In the compound represented by the fluorescor-precursor formula $Y_1$—A—$Y_2$, A is a fluorescer-precursor paradihydropolycyclic aromatic hydrocarbon derivative, and $Y_1$ and $Y_2$ are each substituents selected from the group consisting of: halocarbonyl; non-bridged carboxylic anhydride including acyloxycarbonyl and aroyloxycarbonyl; bridged carboxylic anhydride; and aryloxycarbonyl, one of said $Y_1$ and $Y_2$ groups being substituted on A at each of the para positions corresponding to the dihydroaromatic structure. Preferred halo carbonyls are bromocarbonyl, chlorocarboxyl, and fluorocarboxyl. The chlorocarboxyl-substituted compounds give the preferred results. Preferred aryloxycarbonyl substituents are nitrophenoxy-carbonyl, dinitrophenoxycarbonyl, cyanophenoxycarbonyl, and trifluoromethylphenoxycarbonyl. The dihydroaromatic structure is typically of the formula:

[structure showing anthracene-like ring system with "para position" labeled at top and bottom]

The $Y_1$ and $Y_2$ halocarbonyl groups are of the typical formula:

$$-\overset{O}{\underset{\|}{C}}-\text{Halogen}$$

Typical compounds of the above formula $Y_1$—A—$Y_2$ include: the preferred embodiments, a bis(acid halide) (or corresponding anhydride) of a dihydroanthracene, such as (1) [structure with $C_6H_5$ and COCl groups on dihydroanthracene]

(2) [structure with $C_6H_5$ and $\overset{O}{\underset{\|}{C}}OC C_6H_5$ groups on dihydroanthracene]

or (3) [bridged anhydride structure with $C_6H_5$ groups]

and other typical embodiments such as:

(4) [substituted structure with $R_1$–$R_6$, Y groups] , or (5) [substituted structure with $R_1$–$R_{10}$, Y groups] , or

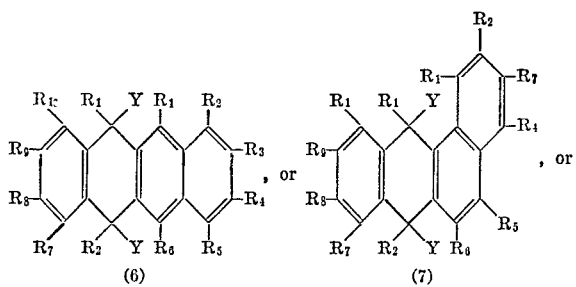

(6) , or (7)

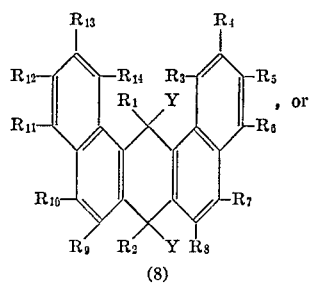

(8) , or

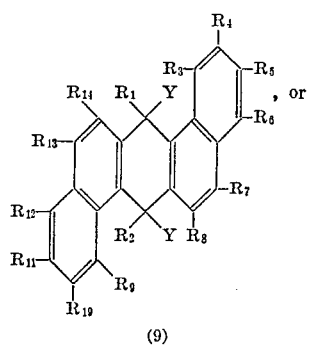

(9) , or

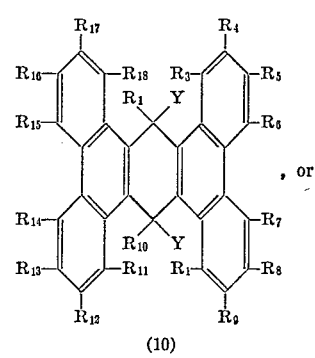

(10) , or

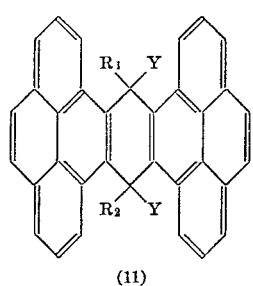

(11)

wherein each of the Formulae 4–11, the $R_1$–$R_{18}$ substituents are each selected from the group consisting of hydrogen, aryl, alkyl, halogen, cyano, nitro, sulfo, carbonyl, substituted alkyl or aryl, carboxy chlorocarbonyl, lower (about $C_1$–$C_7$) carbalkoxy, etc. Specific examples include: methyl, ethyl, dodecyl, phenyl, methoxy, ethoxy, dodecoxy, phenoxy, fluoro, chloro, bromo, cyano, —$SO_2$, —H, —$NO_2$, substituted phenyl, such as 4-methoxyphenyl, 3-cyanophenyl, 2-methylphenyl, 4-phenylphenyl, and substituted alkyl, such as, chloromethyl, methoxymethyl, 2-cyanoethyl, 5-carboxyhexyl.

The peroxide compound employed in the following disclosure means any one or more peroxides such as the preferred hydrogen peroxide, or the hydroperoxides or the diacyl and diaroylperoxides.

Typical hydroperoxides include peroxides such as (1) hydrogen peroxide, (2) the organohydroperoxides and the organoperacids, and (3) the like.

Anhydrous hydrogen peroxide which may be typically employed may be prepared from aqueous 90% $H_2O_2$ in a conventional manner, or it may be generated in situ from a perhydrate, for example. Typical perhydrates are perhydrate of urea (urea peroxide), perhydrate of pyrophosphate (sodium pyrophosphate peroxide), perhydrate of histidine (histidine peroxide), and the like. Still another form in which the anhydrous $H_2O_2$ may be provided in the composition is that of an anhydrous solution of $H_2O_2$ in a suitable solvent, such as an ether, an ester, an aromatic hydrocarbon, etc. of the type defined hereinafter and referred to hereinabove as a diluent in the composition.

Typical substantially equivalent organohydroperoxides and organoperacids for purposes of this invention include compounds such as tertiary butyl hydroperoxide, Tetralin hydroperoxide, cumene hydroperoxide, cyclohexane hydroperoxide, 1-ethylcyclohexane hydroperoxide, 1-methylcyclohex-2-ene hydroperoxide, n-butyl hydroperoxide, peroxy 4-chlorobenzoic acid, 1-phenyl-1-methylpropyl hydroperoxide, dimethyl - p - methoxyphenyl methyl hydroperoxide, 2-butanone 3-hydroperoxide, allyl hydroperoxide, triethylmethyl hydroperoxide, 9-xanthenyl hydroperoxide, 9,10-diphenyl-9,10-dihydroanthracene 9,10-dihydroperoxide, indole-3-hydroperoxide, 1,2,3,4-tetrahydrocarbazolyl - 4a - hydroperoxide, 9 - amino - 10-phenyl-anthracene hydroperoxide or 2,3-dimethylindole-3-hydroperoxide, and the like.

Typical diluents within the purview of the instant discovery are those (1) that do not readily react to frustrate the production of chemiluminescent light of this invention, and/or (2) which may be a liquid form of any one or more of the essential reactants, such as tertiary butyl hydroperoxide. The peroxide employed must be at least partially soluble in the diluent employed.

Water need not be added as a necessary reactant in the production of chemiluminescent light in the present invention; however, it may well be that water is necessary for the chemiluminescent reaction and that the required quantity of water is produced during the reaction of the necessary reactants of this invention. Moreover, water can be present as a supplemental solvent, but because the water tends to react with bis(acid halides) or anhydrides thereof, and to thereby quench the chemiluminescent reaction, water cannot be employed as the sole or major solvent. Any non-reactive diluent may be employed so long as the peroxide of this invention is at least partially soluble in the diluent.

The following are illustrative of the additional diluents or solvents which may be employed: non-cyclic or cyclic ethers, such as diethyl ether, diamyl ether, diphenyl ether, anisole, tetrahydrofuran, dioxane, 1,2-dimethoxyethane, and the like; esters, such as ethyl acetate, propyl formate, amyl acetate, cyclohexyl acetate, dimethyl phthalate, diethyl phthalate, methyl benzoate, and the like; aromatic hydrocarbons, such as tertiary butyl benzene, benzene, xylene, toluene, and the like; and aliphatic hydrocarbons such as cyclohexane, hexane, pentane and the like.

The fluorescent compounds are not necessary but may be additionally included. Those contemplated herein are numerous and they may be defined broadly as those which do not readily react on contact with the peroxide of this invention; likewise, they typically do not readily react with bis(acid halides) or anhydrides thereof. Typical suitable fluorescent compounds which may be also used with the present invention are those which have a spectral emission falling between 330 millimicrons and 700 millimicrons and which are at least partially soluble in any of the above diluents, if such diluent is employed. Among these are the conjugated polycyclic aromatic compounds having at least three fused rings, such as: anthracene, substituted anthracene, benzanthracene, phenanthrene, substituted phenanthrene, naphthacene, substituted naphthacene, pentacene, substituted pentacene, and the like. Typical substitutents for all of these are phenyl, lower alkyl, chlorine, bromine, cyano, alkoxy ($C_1$-$C_{16}$), and other like substituents which do not interfere with the light-generating reaction comptemplated herein.

Numerous other fluorescent compounds having the properties given hereinabove are well-known in the art, such as, for example, trans-stilbene, 1,3-diphenyl isobenzofuran, pentaphenyl phosphole oxide, 10-methyl-9-acridanone, and the like. Many of these are fully described in "Fluorescence and Phosphorescence," by Peter Pringshein, Interscience Publishers, Inc., New York, N.Y., 1949. While only typical fluorescent compounds are listed hereinabove, the person skilled in the art is fully aware of the fact that this invention is not so restricted and that numerous other fluorescent compounds having similar properties are contemplated for use herein.

It should be noted, however, that also a fluorescent or fluorescer-producing (1) organohydroperoxide, (2) organoperacid, or (3) organoperoxyoxalyl halide may additionally be employed, including typical fluorescer peroxides such as (1) dimethyl-2-anthracenylmethane hydroperoxide and (2) 2-carboperoxyanthracene, respectively.

The bis(acid halide) or anhydride thereof, the preferred compound of the $Y_1$—A—$Y_2$ compounds of this invention, as noted above, it the sole essential fluorescer. Whatever fluorescent compounds are employed, total concentration is normally present in the range from about $10^{-5}$ to 5, preferably $10^{-4}$ to $10^{-1}$ molar and the diluent employed must be present in a sufficient amount for the reactants involved to obtain the chemiluminescent reaction.

The chemiluminescent composition of this invention which obtains chemiluminescent light emission upon the admixing of the ingredients of the composition, may be admixed in a single stage of admixing or in a sequence of steps of admixing the separate ingredients. Accordingly, alternative compositions may be prepared which may be stored over an extended period of time and which may be admixed with the final ingredient at a time when the chemiluminescent lighting is desired. For example, the composition may be a composition which includes (1) a bis(acid halide) of a dihydroanthracene, (2) a solid (dry) peroxide compound, such as sodium perborate. However, if a peroxide is present, the addition of water will cause the chemiluminescent process to proceed substantially instantly. A typical alternative composition would be a composition which includes the acid halide reactant, and a non-aqueous diluent, but which does not include a peroxide compound. The preferred compositions which would be less than all necessary components to produce a chemiluminescent light, and would be a composition which would be substantially stable to a practical degree over an extended period of time; otherwise, there would be no real advantage in forming a chemiluminescent reactant to be employed in a subsequent chemiluminescent reaction. Accordingly, if a composition is prepared which includes the water reactant, it is necessary to relatively promptly thereafter admix the peroxide compound of this invention before the water reacts with the bis(acid halide), for example. A typical composition, for example, could be an admixture of (1) one or more solid compounds of the above formula $Y_1$—A—$Y_2$ with (2) a perhydrate peroxide.

The chemiluminescent reaction process of this invention may be carried out at any temperature below boiling. Temperature is not critical.

The pH of the reaction media (mixture) is typically about neutral, but may include a basic compound such as $C_5H_5N$, triethylamine, KOH, etc.

The order of addition of the reactants in the chemiluminescent reaction is not critical, except as noted above regarding water addition.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular additional fluorescent component employed in the reaction mixture, and the particular compound of this invention that is employed.

In the practice of the process of this invention, the mechanism of the chemiluminescent reaction is believed to be as follows. As an example, a typical anhydride is illustrated.

A typical anhydride may be of the formula:

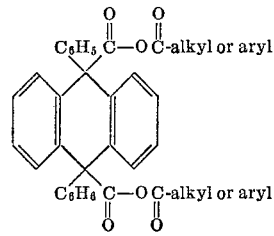

or

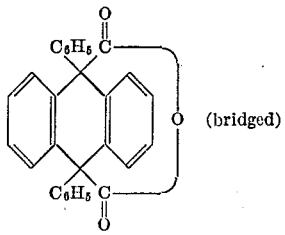

When the peroxide is added, the carbonyl groups are removed, forming a compound which is a fluorescer, water and carbon dioxide, and emitting light as follows:

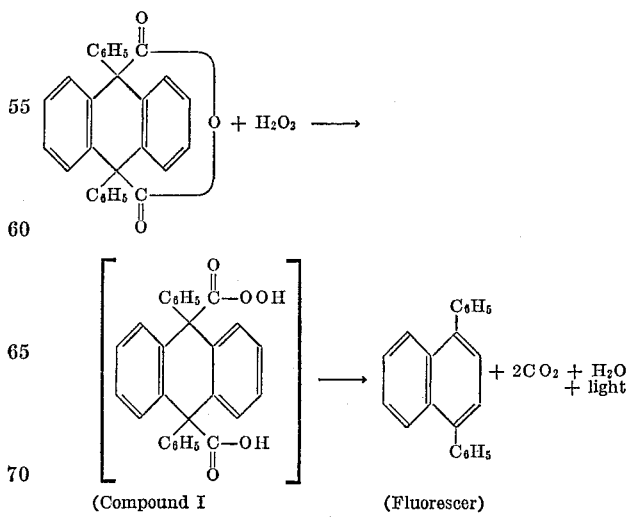

It should be noted that Compound I is a new compound, 9-carboxy-10-carboperoxy-9,10-diphenyl - 9,10 - dihydroanthracene.

Another typical reaction is represented by the following:

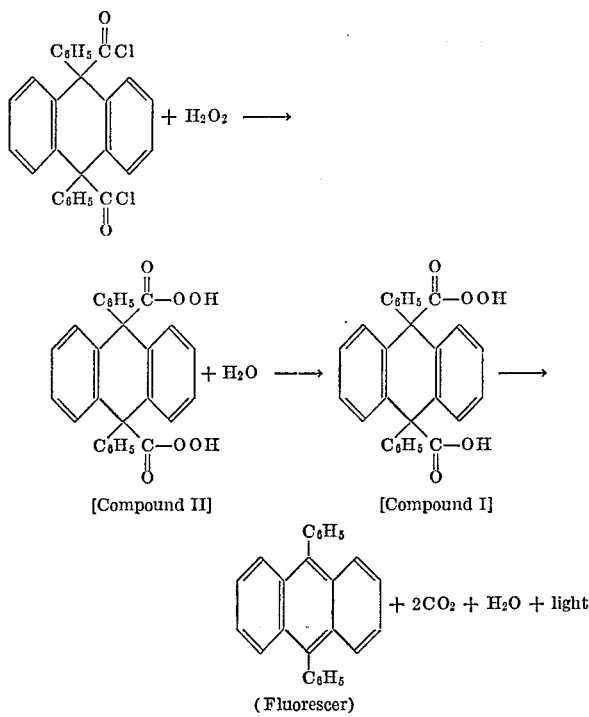

[Compound II]   [Compound I]

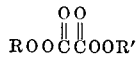
(Fluorescer)

If an organohydroperoxide were employed in the above reaction [Compound II] would have the structure:

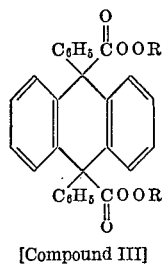

[Compound III]

and Compound I would have the structure:

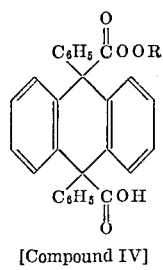

[Compound IV]

Although the above-represented reactions are believed to be correct, the applicants are not to be bound by the above theory of reaction.

Pursuant to the present invention disclosed herein, very intense light is generated and the light emissions last anywhere from about 16 to about 60 times longer than that of the art-known aqueous compositions described hereinbefore, such as oxalyl chloride.

The following examples are intended to illustrate the present invention and are in no way intended to limit the invention except as limited in the appended claims.

Example 1

A freshly prepared solution of 10 ml. of 1 M oxalyl chloride in anhydrous diethyl ether and 5 mg. of 9,10-diphenyl anthracene was reacted with 10 ml. of 0.75 M anhydrous tertiary butyl hydroperoxide in anhydrous diethyl ether. No chemiluminescence was observed.

This Example 1 demonstrates that the substitution of ROOH for HOOH in the process of Chandross in a completely anhydrous solvent does not provide chemiluminescent light.

Example 2

Di-tertiarybutylperoxyoxylate (0.2 g.; 0.85 millimole) typically prepared by the method of Bartlett J. Am. Chem. Soc. 82, P. D. Bartlett, E. P. Benying, R. E. Pincock, 1762 (1960) was discovered in 50 ml. of anhydrous ethyl acetate containing 5 mg. of 9,10-diphenyl anthracene. The addition of one ml. of water to this solution in the dark failed to produce light.

This Example 2 demonstrates that compounds of the di-substituted formula $$ROO\overset{O}{\overset{\|}{C}}\overset{O}{\overset{\|}{C}}OOR'$$

fail to obtain chemiluminescent properties.

Example 3

The addition of 5 drops of di-t-butylhydroperoxide to a solution of 1.5 g. (0.01 mole) of oxalyl chloride, and 2-3 mg. of rubrene in 20 ml. of benzene produced no light even on shaking.

The above Example 3 demonstrates that compounds of the typical formula ROOR is not an operative peroxide compound when employed typically with oxalyl chloride and a fluorescer, in the production of chemiluminescent light.

Example 4

In an experiment similar to Example 3 in which benzoyl peroxide replaced ditertiary butylperoxide, no light was produced.

Example 5

To a mixture of about 5 ml. of anhydrous 1,2-dimethoxyethane, about 0.2 mg. of potassium hydroxide, about 1 mg. of rubrene and a few drops of 90% hydrogen peroxide is added 3-5 mg. of acetyl chloride. There is no appreciable light emission.

Example 5 illustrates that even random acid chlorides which might be suspected of being structurally and therefore chemically similar to oxalyl chloride do not in fact produce chemiluminescent light when reacted in a manner similar to the oxalyl chloride chemiluminescent reaction of Chandross.

Examples 6 through 10

The Example 5 procedure was separately repeated for (Example 6) benzoyl chloride, for (Example 7) malonyl chloride, for (Example 8) phthaloyl chloride, for (Example 9) propionyl chloride, and for (Example 10) hexanoyl chloride. In no instance was there any significant or substantial amount of light produced.

Thus, none of the chlorides of Examples 5 through 10 obtain the Chandross reaction of oxalyl chloride. The compounds of Examples 5, 7, 9, and 10 are more closely related to oxalyl halide than are the aromatics of Examples 6 and 8, and the aromatics of this invention typically illustrated by Example 11 below. Thus, random acetyl halides do not have chemiluminescent properties similar to oxalyl halide, and there is no known reliable basis for predicting which, if any compounds will have chemiluminescent properties. Moreover, Examples 1 through 4 above are evidence to the fact that many aspects of a particular chemiluminescent reaction are specific and cannot always be reliably predicted.

Example 11

To a solution of about 0.2 g. of 9,10-diphenyl-9,10-dihydroanthracene - 9,10 - dicarboxylic acid anhydride in about 10 ml. of tetrahydrofuran (solvent) is added about 10 ml. of a cold 1 M aqueous sodium peroxide solution. A blue-violet light emission is observed.

This Example 11 illustrates the employment of a typical anhydride of a dihydroanthracene of this invention.

Example 12

A solution of 100 mg. of 9,10-dichloro-carbonyl-9,10-diphenyl-9,10-dihydroanthrahene in about 50 ml. of tetrahydrofuran is added to about 10 ml. of 1 M aqueous sodium peroxide. A blue-violet light emission is observed.

Example 12 further illustrates this invention, employing a bis(acid halide) of a dihydroanthracene.

Example 13

A solution 1.0 g. of 9,10-bis(4-nitrophenyloxycarbonyl)-9,10-diphenyl-9,10-dihydroanthracene in 200 ml. of dimethylphthalate is combined with 50 ml. of 1 M hydrogen peroxide in dimethylphthalate and 4 ml. of water. A strong, long-lasting blue light emission is observed. When the example is repeated using 4 ml. of 1 molar aqueous sodium hydroxide instead of water the light emission is more intense but shorter lived.

It is within the scope of this invention to make such modifications of the compositions and processes disclosed herein as would be obvious to a person of ordinary skill in this art, and it is to be understood that the examples illustrating this invention are intended to limit the invention only insofar as is stated in the specification and as the following claims are limited. Also, it is within the scope of this invention to form an apparatus such as a container or (1) insoluble or (2) dissolvable capsule in which the reactant of this invention is enclosed for subsequent reaction with the other ingredients necessary to produce chemiluminescent energy and light. Embodiments of this invention also included, for example, are systems in which (1) two or more immiscible diluents are employed in which part of the necessary reactants are in one solvent and other reactants are in another solvent, and in which the diluents have a common interface, and (2) a diluent containing a reactant which is insoluble whereby the chemiluminescent reaction occurs at the point of contact between the diluent and the insoluble reactant.

I claim:

1. A fluorescer-precursor compound of the formula $Y_1$—A—$Y_2$ in which A is a paradihydropolycyclic aromatic hydrocarbon derivative, and $Y_1$ and $Y_2$ are each one of said $Y_1$ and $Y_2$ groups being substituted on A at each of the para positions corresponding to the dihydroaromatic structure.

2. A compound of the formula:

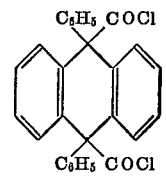

References Cited

Schlenk et al.: Ann. 463, 128–9 (1928).

LORRAINE A. WEINBERGER, Primary Examiner

R. D. KELLY, Assistant Examiner